United States Patent [19]

Schwenk et al.

[11] 3,739,882
[45] June 19, 1973

[54] SHOCK ABSORBING DEVICE ESPECIALLY FOR VEHICLES

[75] Inventors: Kurt Schwenk; Kurt Rupprecht, both of Welfsburg, Germany

[73] Assignee: Volkswagenwerk Aktiengesellschaft, Wolfsburg, Germany

[22] Filed: Apr. 8, 1971

[21] Appl. No.: 132,330

[30] Foreign Application Priority Data
Apr. 9, 1970 Germany............... P 20 16 855.2

[52] U.S. Cl. ............................ 188/1 C, 293/71 R
[51] Int. Cl. .................................................. F16f 7/12
[58] Field of Search................. 188/1 C; 267/139; 293/71 R, 71 P

[56] References Cited
UNITED STATES PATENTS

| | | | |
|---|---|---|---|
| 1,727,982 | 9/1929 | Jacobs.............................. | 293/71 R |
| 3,056,620 | 10/1962 | Adams et al...................... | 293/71 R |
| 3,432,200 | 3/1969 | Barton .............................. | 293/71 R |
| 3,493,257 | 2/1970 | Fitzgerald et al. ................ | 293/71 R |
| 3,494,607 | 2/1970 | Rusch ............................. | 188/1 C X |
| 3,610,609 | 10/1971 | Sobel ................................ | 293/71 R |

*Primary Examiner*—Duane A. Reger
*Attorney*—Ernest F. Marmorek

[57] ABSTRACT

Shock absorbing device having an outer and an inner section supported for relative movement with respect to each other in the direction of a shock force, an intermediate section placed into the space formed by the outer and inner sections and comprising a material having volume-elastic properties, the elastic material is treated with a material having adhesive properties for delaying the return of it into the original position due to its elastic properties after a shock force causing compression of the elastic material has ceased, and wherein the outer section comprises an elastic material a portion of which is formed to receive the volume-elastic intermediate section, and the inner section lying closer to the object to be protected from the shock is made from a rigid profile and supports the outer section containing the volume-elastic material.

10 Claims, 8 Drawing Figures

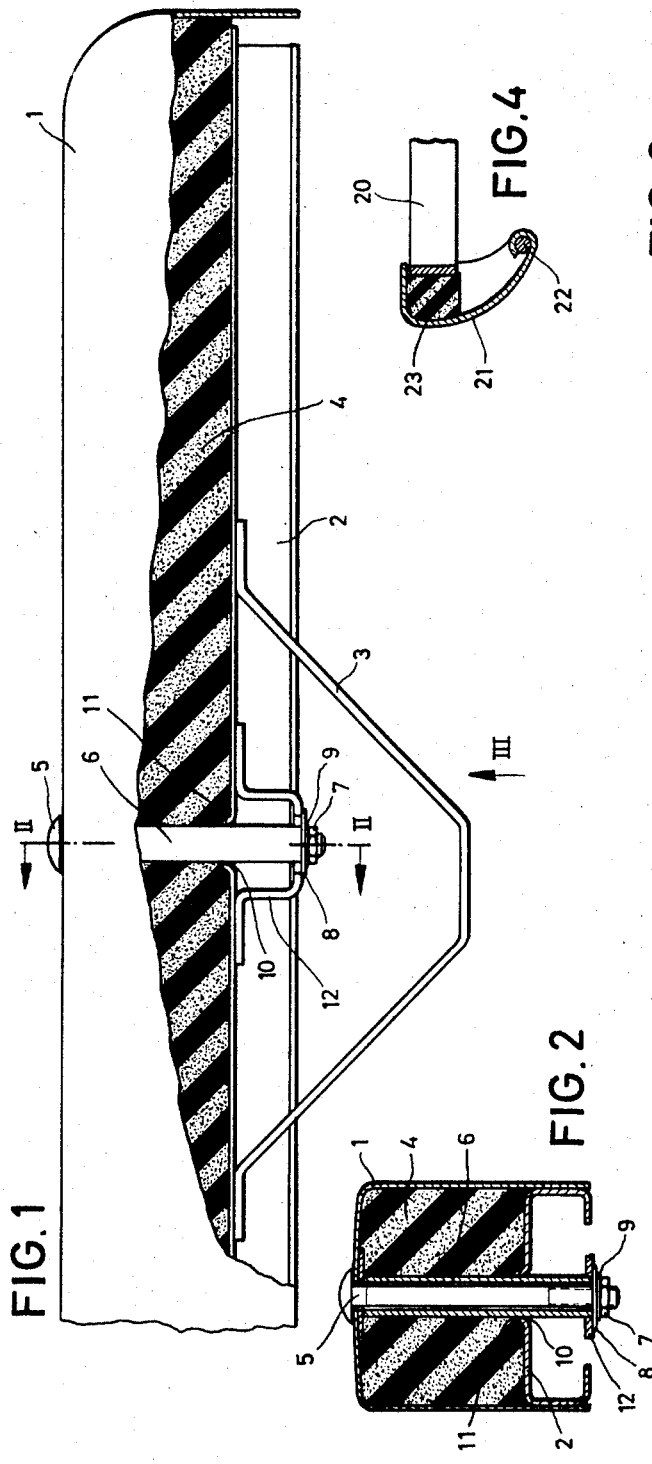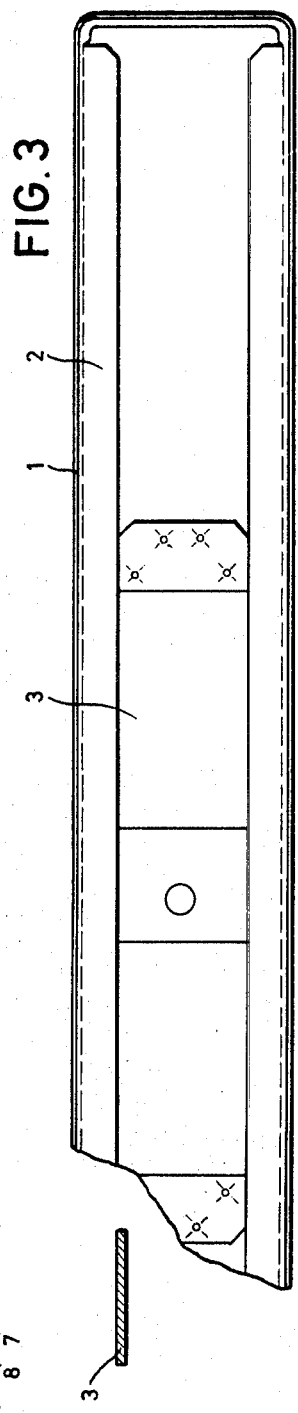

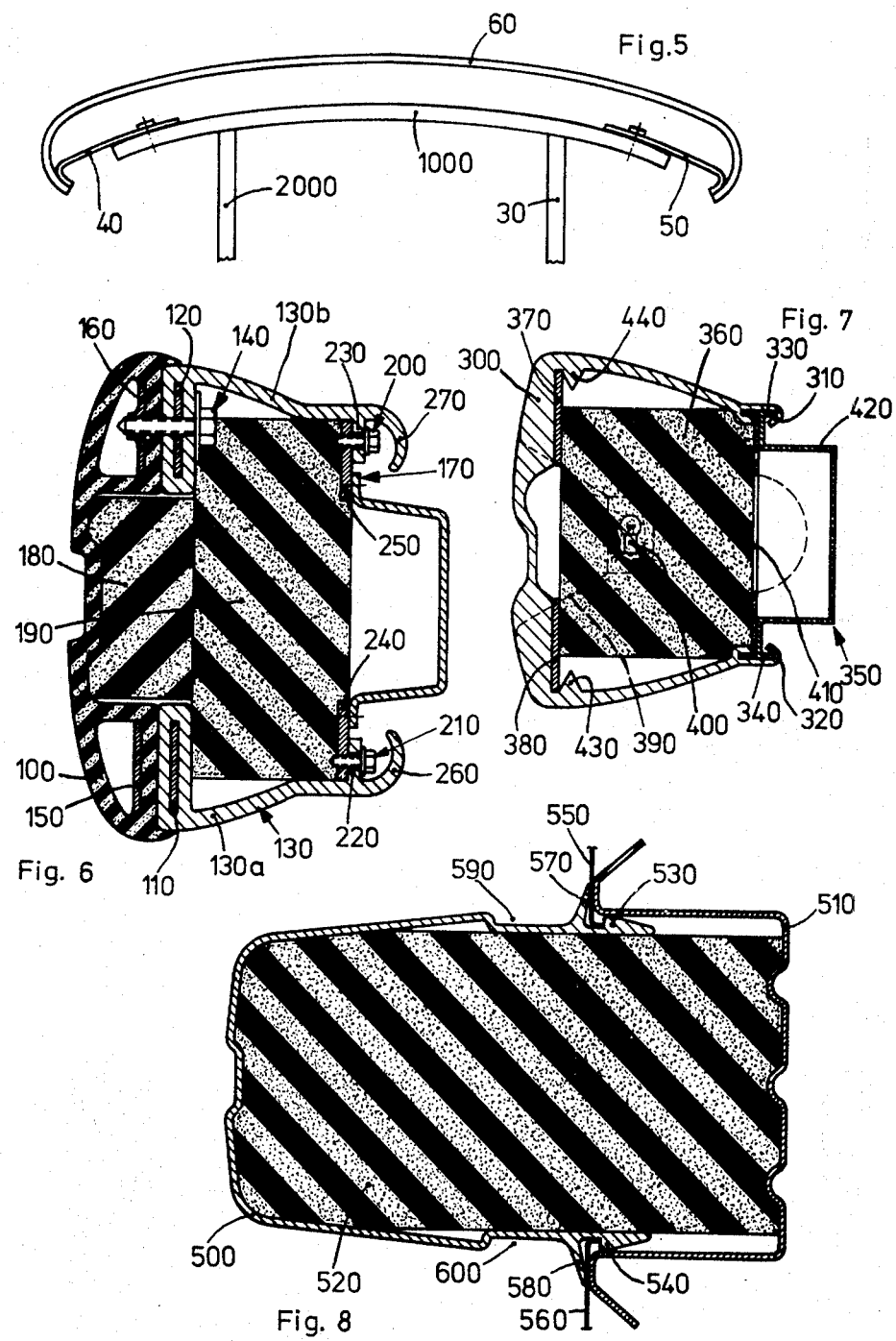

SHOCK ABSORBING DEVICE ESPECIALLY FOR VEHICLES

Reference is had to the patent application Ser. No. 132,448 of Kurt Schwenk, filed on Apr. 8, 1971.

FIELD OF THE INVENTION

The present invention relates generally to a shock absorbing means, and more particularly, it relates to a shock absorbing means used with motor vehicles. One application of the shock absorbing means of the present invention can be in the form of a bumper for an automobile, however, in other situations, it can be used within the vehicle itself as an impact surface especially in the region of the dash board or as an impact surface on the steering wheel or as a lining on the inside of the roof.

The field of applicability of the present invention is not limited solely to the motor vehicle field. It can be also used on railroad cars or boats or as a part of a stop block used in railroad yards or on piers in ports.

BACKGROUND OF THE INVENTION

Recently it has been realized that in order to avoid or reduce the dangerous consequences of a collision, for example, in case of a motor vehicle, it is not sufficient to provide elastic members the only effect of which practically amounts to a time delay of the collision. For example, if the bumper of a motor vehicle would be outfitted with springs alone, then the negative acceleration generated during the collision would be somewhat reduced in its amplitude, however, there could be no energy dissipation resulting from such arrangement, only an energy storage could take place which, after a short time, as soon as the spring relaxes or springs back, results in a counter impulse. Such opposite shocks following immediately one after the other can be extremely dangerous to the passengers in a motor vehicle.

The realization of the above events led to the provision of the so called collapsible zones in the motor vehicles, that is, zones which in case of a collision create an energy dissipation by becoming deformed. One can immediately become convinced that such an expensive deformation which prevents further use of the motor vehicle can be afforded only in a case when the alternative would be a serious damage to the passenger of the vehicle.

One would think that instead of using springs a fluid having damping capabilities such as oil, could be used. A bumper constructed accordingly would become, however, very heavy and expensive.

In German Pat. No. 1,288,467 63 c-70 a bumper is proposed to protect the passenger of a motor vehicle from the sudden and dangerous relaxation of an elastic material, such bumper comprising substantially an enclosure filled with a liquid medium and having apertures formed therein which only permit the flow of the liquid medium in case of a collision. There can be no question that the above-mentioned patent proposes an elastic bumper which is capable of dissipating the energy of a collision, however, the balancing of the sudden energy dissipation is attained only by a destruction of the entire bumper arrangement.

SUMMARY OF THE INVENTION

It is, therefore, an object of the present invention to provide an improved safety shock absorbing means for use with motor vehicles which is capable of dissipating the shock energy and which is made from a relatively inexpensive material and which during the dissipation of the shock energy does not lead to the destruction of the bumper at least at relatively weak collision forces.

It is a further object of the present invention to provide an improved safety bumper which after deformation under weak collision forces, after termination of the forces, returns to its original shape thereby self-repairing itself.

According to the present invention a shock absorbing device is provided wherein a pair of profiled sections arranged for movement relatively with respect to each other in the direction of the shock force enclose a volume-elastic material the spring-back of which due to its elastic characteristics is reduced by saturating the elastic material with an adhesive material.

According to the present invention the volume-elastic material or intermediate section between the two moving sections is made from an energy dissipating material the spring-back action of which due to its elastic characteristics, that is, the return of such material in its initial form is greatly reduced by saturating it with a material having high adhesive characteristics and such spring-back action is reduced to such an extent that it occurs only at speeds representing no danger for the passengers in the vehicle.

The above greatly reduces spring-back action of the volume-elastic material employed in the shock absorber device according to the present invention results in the automatic repair of the bumper itself after the collision. After a certain time the bumper or shock absorber according to the present invention returns to its original form which it had before the collision and without the necessity of employing any additional measures.

In a preferred embodiment of the present invention the elastic material is a synthetic foam which is saturated by an adhesive having high adhesive characteristics which, when the synthetic foam material is pressed together, causes the adhesion of the wall portions of the individual cells. Such adhesive effect can be eliminated only slowly by the elasticity of the synthetic foam material, and as a result, the spring-back affect of the synthetic material is greatly reduced.

As a saturating material one may use bitumen or wax. In selecting the saturating material one should consider as an important factor that the saturating material should retain its adhesive action for a longer time. Also it should not easily harden or become fully liquid. For this reason one prefers tough saturating materials. It is preferred that the intermediate section comprising the volume-elastic material be hermetically enclosed, such as in a sealed foil bag or in a natural skin.

In most of the preferred embodiments of the invention the outer shell comprising the first and second profiled sections are made from a rigid material. As already mentioned above it is also a desirable object of the present invention that the bumper or shock absorber device according to the present invention should repair itself after the collision, that is, it should return to its original form. In order to support this requirement it is necessary that the profiled section which is considered as the outer section with respect to the object protected against the shock is divided along the direction of its longer dimension. As a result, in the direction of such dimension there are several adjacent segments which can be resiliently interconnected with each other or not connected at all. Such segments form then for the volume-elastic intermediate section a kind of armoring which can be made in a shingle-like fashion. The outer profiled section can be also formed from a form-retaining hard rubber or synthetic material which behaves very resiliently at light shock forces and may additionally prevent lasting damages to the shock absorber device.

The outer profile section can be supported on the other two profile sections, that is the intermediate section and the inner profile section which in turn is secured to the object protected by means of bolts which span the entire distance taken up by the volume-elastic material and which are secured in a sliding bearing in one of these profile sections to provide for a relative movement between them.

The bolts mentioned above in connection with one of the preferred embodiments and which serve for the supporting of one of the profiles could be bolts having circular cross-sectional areas, how-ever, the invention is not limited to bolts having such cross sectional area even though the preferred embodiment requires the employment of threaded bolts. An understanding of the invention makes it clear that bolts of other cross-section can be advantageously used and the sole requirement to them is to provide a relative movement between the two profiles during collision.

The above-mentioned sliding bearing for the bolts is provided within the inner profiled section so that in case of a collision the outer bolt ends will not project outwardly.

It is within the scope of the invention to provide for passing the above mentioned bolts outside of the space occupied by the volume-elastic material. In the preferred embodiment described in more detail hereinafter the bolts pass through the intermediate section occupied by the volume-elastic material whereupon a very compact construction of the shock absorbing device is attained as well as the bolts also contribute to the support of the intermediate layer.

According to another embodiment of the present invention the outer profiled section has a U-shape cross section having an open end turned toward the object to be protected and the inner profiled section is placed into it in a piston-like fashion and forms with the outer profiled section a chamber which is then filled with the volume-elastic material.

For the above mentioned embodiment it is desirable that the inner profiled section as an I-shaped or a C-shaped cross-section and in the latter case the open side of the profile faces the object, that is, in the case of a motor vehicle, it faces the chassis of the vehicle to which the bumper is secured. In the event the bolts are selected to pass through the intermediate or volume-elastic material as described above, then the inner profiled section is provided with holes for the bolts the edge portions of such holes, for example by appropriate formation, serve as the sliding bearing for the bolts.

In another embodiment of the present invention a profiled section which is considered as the outer profiled section with respect to the object protected is hingedly supported on the inner profiled section which in turn is secured to the object protected.

There can be further variations to the present invention such as in order to take care of local affects on the shock absorbing device, local changes of the form thereof should be made. Such for example, in accordance with another embodiment of the present invention, the outer profiled section is made from an elastic material and forms a member serving for the enclosure of the volume-elastic material which in turn is supported on the rigidly formed inner profiled section.

Also in this case for the volume-elastic material one may use a synthetic foam material and in order to attain the desired delay of the spring-back affect of this material it is saturated with a material having high adhesive characteristics. Such material is for instance the bitumen. It is within the scope of the present invention to use such volume-elastic materials which can be slowed down without additional saturation, that is, in case of collision, they are capable of return into their original form very slowly.

It is an important aspect of the present invention, as emphasized already, above, that the shock absorbing device according to the present invention should automatically repair itself unless the collision force exceeds certain limits.

In one of the preferred embodiments of the present invention, the enclosure formed by the outer and inner profiled sections has the shape of a U the bottom portion of which is formed by the outer profiled section and in the region of its outer edges it is provided with profiled members which form a positive locking with counter profiled members formed on the inner profiled section. In this embodiment of the present invention the enclosure, that is, the outer profiled section is secured to the inner profiled section practically by being clipped thereto without providing additional clipping means and wherein the inner profiled section can be either a constituent member of the vehicle or an independent member of the shock absorbing device.

The invention also provides that in the event of a U-shaped cross-sectional formation of the enclosure, in the region of the end portions of the U-shape flanges are provided which securely engage counter flanges of the inner profiled section.

The invention also provides for lip portions formed on the outer profiled section for covering the coupling or securing points of the two sections.

Preferably the inner profiled section has the cross sectional shape of a U in which at its end portions facing the object projections are provided which protrude into hook portions formed on the inner profiled section. In order to provide for a certain compression of the volume-elastic material in case of a collision or shock force affecting the shock absorber without damage, the shock absorber according to the present invention is given additional certain elasticity by providing the outer profiled section, that is the outer enclosure, with lip portions which are abutting on the inner profiled section and the rigidity of which is greater in the direction of the shock, than at its portion joining it to the enclosure. In some cases the invention provides that the inner profiled section which is a bumper part appropriately made in the event the invention is applied to motor vehicles, in the event of collision forces which exceed the rigidity of the lip portions mentioned above, the lip portions become deformed to provide a sliding bearing for the enclosure. In this case the extent of the compression of the volume-elastic material, in case of a collision, on the first stage is determined by the elasticity of the enclosure, while in case of stronger collision forces the enclosure, that is, the outer profiled section can ram into the inner profiled section.

In order to provide for the return of the shock absorbing device after a collision into its original form it is desirable to provide spring lugs or fingers at the end portions of the inner profiled section, to which the end portions of the outer profiled section are secured. The spring fingers must be so constructed and supported that they should be able to spring relatively wide back in the direction of the vehicle without undergoing any lasting deformation. Special importance is assigned to such spring fingers then when the outer enclosure itself is made from elastic material and comprises a resilient metal strip running along the outer profiled section and with which the outer profiled section is connected to the end portions of the inner profiled section, and in the described embodiment, through the spring fingers. The securing of the elastic material on the enclosure supported on the metal strip can be had by providing wedge-like projections on the elastic material with which the elastic material is clipped onto the metal strip.

It is also within the scope of the present invention to provide for bolt connections which are absolutely necessary for connecting the metal strip with a spring finger to secure simultaneously the elastic material at the region of the metal strip.

In the event that in the volume-elastic material a lamp is placed behind a recess formed in the outer profiled section, then the lamp is supported on the metal strip which at least in the region of the lamp is formed in a cut-out fashion. Such construction has the advantage that in case of a collision the lamp can, without damage, be pressed in the direction of the inner profiled section, which also is constructed to have an appropriate recess formed therein in order to accommodate the movement of the lamp thereinto. After the collision force has been terminated the lamp is returned into its original position by the spring-back action of the shock absorbing device. A similar affect can be obtained by securing the lamp on a formation of the enclosure which in that location, that is, at the position of the lamp, can be made rigid enough to support the lamp. In the above described case the lamp discussed was a position signal or blinking lamp, however, the low beam and high beam lamps or fog lights can also be accommodated similarly to the above construction.

BRIEF DESCRIPTION OF THE DRAWINGS

The invention will become more readily apparent from the following description of preferred embodiments thereof shown in the accompanying drawings, in which:

FIG. 1 illustrates in top view a bumper made according to the present invention, partly in section;

FIG. 2 is a view taken along the section II—II in FIG. 1;

FIG. 3 is a view of the bumper when viewed in the direction of the arrow III in FIG. 1;

FIG. 4 illustrates another embodiment of the present invention;

FIG. 5 illustrates a further embodiment of the present invention in which the outer profiled section is made from an elastic material; and FIGS. 6, 7 and 8 are cross-sectional views taken through further embodiments of the present invention.

DESCRIPTION OF THE PREFERRED EMBODIMENTS

The essential parts of the shock absorbing device illustrated in FIGS. 1-3 as one of the exemplary embodiments of the present invention is an outer profiled section 1, an inner profiled section 2 connected by a rigid supporting strap 3 to the object to be protected against the shock or, as shown in the exemplary embodiment, to the chassis or to the frame of a motor vehicle. Between the appropriately shaped outer and inner profiled sections 1 and 2, respectively, an intermediate section or chamber is provided into which the volume-elastic foam material is placed which is saturated by an adhesive agent having a good adhesive capability.

As more clearly seen in the cross sectional showing of FIG. 2 the outer profiled section 1 has a U-shaped cross-section which at its open end receives the piston-like inner profiled section 2 having a C-shaped cross section. By means of profiled sections 1 and 2 a closed space is formed which is then filled with the damping material 4 (saturated foam material).

The entire arrangement is held together by a threaded bolt 5 which can be present in any desired number along the longitudinal dimension of the bumper. On bolt 5 there is a spacing tube 6 placed over which together with the nut 7, the disc or washer 8 and the spring washer 9 provides a fixed seat for the bolt 5 on the outer profiled section 1.

On the other hand, the inner profiled section 2 is provided with a hole 10 for the bolt 5 with the spacing tube 6 thereon so that the flanging at 11 can be formed as a sliding bearing for them. The bridge-like shoulder serves only for limiting the axial movement of the bolt 5 in a direction away from the vehicle, that is, as seen in FIG. 1, in the direction upwardly, but it is not intended to serve as a fixed support.

In the event a collision takes place, the outer profiled section 1 can, by moving along with it the bolt 5, be displaced in the direction toward the vehicle causing a compression of the intermediate section comprising the volume-elastic material and, as a result, the inner profiled section 2 for all practical purposes behaves as a piston which moves into the outer profiled section 1 serving as the cylinder. As soon as the collision force terminates the compression of the volume-elastic material of the intermediate layer 4, the back-springing of this material will become delayed in time by the fact that it is saturated by the adhesive material so that the quick rebounce accompanying common springs and causing the above described damages is not present here. At the same time the application of the present invention avoids the disadvantages described above in connection with the so called collapsible zones which require a replacement of the bumper or the portion where the collapsible zone is build in, while the material used for the intermediate section 4 returns in its original shape after a short while.

In the embodiment shown in FIG. 4 the chassis 20 serves as the inner profiled section 2 of FIG. 1, on which the outer profiled section 21 is supported by means of a hinge coupling 22. Both profiled sections 21 and 20 also in this embodiment enclose the above described volume-elastic delaying intermediate layer indicated here by 23.

With reference to FIG. 5 it is seen that the inner profiled section 1000 which is made from a rigid material is connected by means of straps 2000 and 30 to the motor vehicle chassis which is not shown on the drawing. At the ends of the inner profiled section 1000 there are spring fingers 40 and 50 secured, such as illustratively shown, by means of bolts, and such spring fingers with their free ends are secured to the metal strip 60, such as by welding, the metal strip 60 in this embodiment is shown also as being from an elastic or resilient material. The metal strip 60 forms a constituent member of the outer profiled section which contains the elastic material itself not shown in FIG. 5. The spring fingers 40 and 50 are so constructed that they are capable of freely bending backwards (which is downwardly in FIG. 5) without losing their elasticity. After termination of the collision force the metal strip 60 and thereby the entire bumper or shock absorbing device tries to return into its original form. The above described parts do not serve to receive the collision energy but only to support the delayed back-spring action of the volume-elastic material of the bumper or shock absorbing device, the volume-elastic material not being shown in FIG. 5.

A similar supporting arrangement as seen in FIG. 5 is also used in connection with the embodiments of the shock absorbing device illustrated in FIGS. 6, 7 and 8.

With reference to FIG. 6 it is seen that the outer profiled section is composed from several parts. It contains in addition to the elastic material which can be made from a synthetic material, and which is identified by the reference number 100, a pair of metal straps 110 and 120 which are embedded into the elastic material in the next described member 130. The connection between 100 and 130 is attained in this embodiment by bolt connections from which only one is shown and identified by the reference 140. The bolt connections in the region of the metal straps 110 and 120 are in the longitudinal direction of the bumper, that is, in a direction vertical to the sheet of drawing with respect to each other. These bolt connections serve in the embodiment shown in FIG. 6 also for the support of the spring fingers 150 and 160 which are similar to the spring fingers 40 and 50 shown in FIG. 5 at the end of the inner profiled rigid section 170.

The members 100 and 130, the latter having a reduced or tapered construction in the direction of the vehicle, form together a receiver or enclosure for the volume-elastic material which has a U-shaped cross-section and which in the illustrative embodiment of FIG. 6 is composed from two pieces (blocks) 180 and 190 and which with its shape is adapted to the chamber enclosed by parts 100 and 130. Also in this embodiment of the volume-elastic material can be an adhesive-saturated synthetic foam material which, under the effect of collision forces, is compressible and which is capable of returning to its old shape in a delayed manner after the collision force is terminated. The enclosure formed by parts 100 and 130 can be made by several methods, such as by casting, drawing, die casting, or blowing. For instance, the member 100 can be made in a continuous die casting process while the leg portion 130 of the U can be made from two separate die molded parts 130a and 130b and placed together. The arrangement consisting of parts 100, 130a and 130b is supported on the inner profiled rigid section 170 in addition to the bolt connection 140 also by further bolt connections 200 and 210. At the last mentioned bolt connection the parts 130a and 130b are provided with innerly pointing flange portions 220 and 230 with which they are abutting against counter flanges 240 and 250 formed on the inner profiled section 170. Furthermore, the enclosure formed by the parts 100 and 130 is provided in the region of its edges turned toward the inner profiled section 170 with lip portions 260 and 270 which have the function to cover the coupling points.

Considering now the embodiment shown in FIG. 7 it is noticed that the enclosure 300 consists from a one piece elastic material and the free edges of this member 300 are provided with profiled portions 310 and 320 which engage flange-like counter profiles 330 and 340 formed on the rigid inner profiled section 350. The securing together of the enclosure 300 containing the volume-elastic material 360 in this embodiment is attained practically by the clipping together of the flange-like portions 330 and 340 with the profiled portions 310 and 320.

The spring fingers 40 and 50 shown in the embodiment of FIG. 5 are interconnected by means of a pair of metal strips 370 and 380. On these metal strips 370 and 380 a lamp 400 is secured by means of the support 390 by welding. In front of the lamp 400, that is, to the left of it in FIG. 7, there is a recess provided in the enclosure 300 and in the volume-elastic material 360 for letting the light through. The inner profiled sections 350 and 410 are provided also with an aperture for letting the lamp 400 and the volume-elastic material 360 lying behind it through and furthermore a pot-like member 420 is provided with which the inner profiled section 350 protects the lamp 400 against the collision force. The members 430 and 440 are wedge-like projections for coupling the member 300 and the metal strip 370 and 380 together.

A different type of enclosure assembly is illustrated in FIG. 8 wherein the enclosure is a single piece-type and has a form of a U the bottom portion of which forms the outer profiled section. Together with the rigid inner profiled section 510 the enclosure 500 surrounds the volume-elastic material 520 which can be placed into the volume formed by the above mentioned two construction pieces either in one piece or by foaming it in or by injection. Both U-shaped cross sections 500 and 510 are facing each other with their open ends and the enclosure 500 in the region of its free end portions in provided with hook-like profiled portions 530 and 540 with which it enters into the space formed by the inner profiled section 510. The inner profiled section 510 is again provided in the region of its free end portion with projections 550 and 560 which, for example, can be formed from the chassis material and which cooperate with the hook-like profiled portions 530 and 540 in such a manner that the enclosure 500 and thereby the volume-elastic material 520 is enclosed and retained by the inner profiled section 510 in a positive locking without the necessity of additional measures. It is noted again also here that the outer and inner profiled sections are to be understood to be the bumper sections one of which is adjacent to the vehicle or object protected, while the other is further away from the object or vehicle to be protected by the arrangement.

The enclosure 500 abuts with its elastic outer lips 570 and 580 on projections 550 and 560 and thereby on the edge portions of the inner profiled section 510 so that members 550 and 560 secure the enclosure 500 against movement to the left or right in FIG. 8. The rigidity of the lid portions 570 and 580 is selected such that under collision forces which do not cause a lasting deformation but only a movement of the enclosure 500 only but the volume-elastic material is not made by them fully compressed, the lid portions remain unaffected. However, in case there is a collision force in FIG. 8 from the left to the right which exceeds the elasticity of the outer lip portions 570 and 580, then the enclosure 500 moves against the elastic effect of the volume-elastic material 520 and forces also the outer lid portions 570 and 580 into the recessed regions 590 and 600 in FIG. 8 while moving to the right. As a result, the inner profiled section 510 forms practically a sliding bearing for the enclosure 500 which under this collision force itself becomes deformed and such deformation causes a deformation of the volume-elastic material 520 by compressing it.

It is within the scope of the present invention to make the enclosure 500 and the volume-elastic intermediate material in integral form made in a reaction-injection molding process.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

We claim:

1. Shock absorbing device comprising a first shaped section and a second shaped section supported for relative movement with respect to each other in the direction of a shock force;
    an intermediate section placed into the space formed by said first and second sections and comprising a material having volume-elastic properties, said properties being such that the return into the rest position by said intermediate section material after a shock force caused compression of said intermediate section material is delayed;
    said first section comprising an elastic material and forming part of an enclosure structure for said volume-elastic intermediate section,
    said second section being made from a rigid material and supporting said enclosure structure containing said volume-elastic material;
    said second section being channel shaped and the open side of which facing the intermediate section and forming a receiving space operable for receiving at least portions of said volume-elastic material in compressed form when said first section has been displaced by the shock force.

2. Shock absorbing device as claimed in claim 1, wherein said enclosure structure has a cross-section of a U the basis of which forming said first section and having edge portions including shaped sections forming positive locking with counter shaped sec-tions formed on the second section.

3. Shock absorbing device as claimed in claim 2, wherein said enclosure includes elastic lip portions abutting against said second section, said lip potions having a rigidity greater in the direction of the shock than the rigidity of the adjoining parts of said enclosure.

4. Shock absorbing device as claimed in claim 1, wherein said second section has associated therewith at least a pair of spring fingers secured to said first section at their end portions.

5. Shock absorbing device as claimed in claim 1, wherein said enclosure includes a resilient metal strip, said metal strip supporting said first section about the end portion of said intermediate section.

6. Shock absorbing device as claimed in claim 2, said edge portions of said first sections including also portions for covering the regions of said positive locking.

7. Shock absorbing device as claimed in claim 1, wherein said second section has an inner portion including hook portions, said enclosure having projections engaging the hook portions of said inner portion and thereby forming a positive locking between said first and said second sections.

8. Shock absorbing device according to claim 6, said first section and said metal strip defining a passage, a recess in said volume-elastic material opposite said passage, a lamp disposed in said recess, and means for supporting said lamp on said metal strip.

9. Shock absorbing device as claimed in claim 8, wherein said second section is formed to accommodate said lamp moving into it during a shock absorbing action to prevent destruction of said lamp by said shock.

10. Shock absorbing device according to claim 1, said receiving space having a reduced volume with respect to the volume of said volume-elastic material.

* * * * *